US009261158B2

(12) United States Patent
Doornbos et al.

(10) Patent No.: US 9,261,158 B2
(45) Date of Patent: Feb. 16, 2016

(54) DAMPER ASSEMBLY AND DEVICE UTILIZING THE SAME

(75) Inventors: David A. Doornbos, Manteno, IL (US); Steven L. Bivens, Kankakee, IL (US); Jurgen Benno Hilpert, Frickenhausen (DE)

(73) Assignee: Illinois Tool Works Inc., Glenview, IL (US)

( * ) Notice: Subject to any disclaimer, the term of this patent is extended or adjusted under 35 U.S.C. 154(b) by 515 days.

(21) Appl. No.: 13/202,178

(22) PCT Filed: Jan. 21, 2010

(86) PCT No.: PCT/US2010/021574
§ 371 (c)(1),
(2), (4) Date: Aug. 18, 2011

(87) PCT Pub. No.: WO2010/096229
PCT Pub. Date: Aug. 26, 2010

(65) Prior Publication Data
US 2011/0296938 A1    Dec. 8, 2011

Related U.S. Application Data

(60) Provisional application No. 61/154,490, filed on Feb. 23, 2009, provisional application No. 61/221,748, filed on Jun. 30, 2009.

(51) Int. Cl.
*F16D 57/00*        (2006.01)
*F16F 9/12*         (2006.01)

(52) U.S. Cl.
CPC ............. *F16F 9/12* (2013.01); *Y10T 74/19637* (2015.01)

(58) Field of Classification Search
CPC ............ F16F 9/12; F16F 9/145; F16D 57/02; E05F 5/00; E05Y 2201/21; E05Y 2201/254; E05Y 2201/266
USPC ........... 188/290, 322.5, 322.12, 294, 83, 272, 188/271; 267/167, 217; 16/72, 82
See application file for complete search history.

(56) References Cited

U.S. PATENT DOCUMENTS

| 4,088,281 | A |   | 5/1978 | Close |
|---|---|---|---|---|
| 4,456,196 | A |   | 6/1984 | Takada et al. |
| 4,527,675 | A | * | 7/1985 | Omata ................ F16F 9/12 16/82 |
| 4,576,252 | A |   | 3/1986 | Omata |

(Continued)

FOREIGN PATENT DOCUMENTS

JP           50-10501         5/1973

OTHER PUBLICATIONS

International Search Report for PCT/US2010/021574 mailed Mar. 18, 2010.

*Primary Examiner* — Anna Momper
*Assistant Examiner* — San Aung
(74) *Attorney, Agent, or Firm* — Paul F. Donovan

(57) ABSTRACT

A damper assembly includes a housing, a rotor rotatable within the housing, a rotor shaft projecting outwardly of the housing and a damper gear disposed on the rotor shaft. A bracket includes legs disposed outwardly of the damper for securing the assembly in a device, the bracket further having a body between the damper and the damper gear, the body exerting force against each the damper and the damper gear. The damper is selectively engageable with and disengageable from the bracket for enabling and disabling relative movement between the damper and the bracket.

19 Claims, 4 Drawing Sheets

(56) References Cited

U.S. PATENT DOCUMENTS

| | | | | |
|---|---|---|---|---|
| 4,614,004 A | * | 9/1986 | Oshida | E05F 3/14 16/82 |
| 4,688,695 A | | 8/1987 | Hirohata | |
| 4,697,673 A | * | 10/1987 | Omata | E05F 3/14 16/52 |
| 6,298,960 B1 | * | 10/2001 | Derr | B29C 65/08 188/290 |
| 6,637,567 B2 | | 10/2003 | Doornbos | |
| 6,682,055 B1 | | 1/2004 | Tomlinson et al. | |
| 6,910,557 B2 | * | 6/2005 | Doornbos | E05F 3/14 188/290 |
| 7,059,454 B2 | | 6/2006 | Muller et al. | |
| 7,152,718 B2 | | 12/2006 | Doornbos et al. | |
| 7,350,629 B2 | * | 4/2008 | Anton | E05F 5/00 188/82.1 |
| 8,079,450 B2 | | 12/2011 | Zeilenga et al. | |
| 2002/0158162 A1 | * | 10/2002 | Fujii | B60R 22/44 242/390.9 |
| 2003/0192750 A1 | * | 10/2003 | Doornbos | E05F 3/14 188/82.1 |
| 2003/0228918 A1 | * | 12/2003 | Doornbos | E05F 5/10 464/57 |
| 2005/0115784 A1 | * | 6/2005 | Muller | F16F 9/12 188/290 |
| 2007/0108676 A1 | * | 5/2007 | Zeilenga | E05F 5/00 267/69 |
| 2011/0120823 A1 | | 5/2011 | Hansen et al. | |

* cited by examiner

DAMPER ASSEMBLY AND DEVICE UTILIZING THE SAME

RELATED APPLICATIONS

The present application is a National Phase of International Application Number PCT/US2010/021574, filed Jan. 21, 2010 and claims priority from, United States Provisional Application Number 61/154,490, filed Feb. 23, 2009, and United States Provisional Application Number 61/221,748, filed Jun. 30, 2009.

FIELD OF THE INVENTION

The present invention relates generally to damper assemblies, drive arrangements for damper assemblies and structures and devices utilizing damper assemblies. More specifically, the invention pertains to a drive arrangement for a one-way movement damper assembly and a retractable strap type crowd control device using the damper assembly.

BACKGROUND OF THE INVENTION

Movement dampers are used in a wide variety of devices to control the movement of device components. In some situations, dampers are used to control movements of components that would otherwise move more suddenly and forcefully than desired. The damper may control movement caused by gravitational forces or movement induced by springs or other actuators. Doors, drawers and pullouts in furniture are some examples of known applications for dampers. In automobiles, dampers are known for use on, for example, glove box doors, console covers, sunglass bins, retractable cup holders and other storage bins or storage areas. Many other devices also use dampers.

Viscous dampers are known. In a viscous damper a rotor is rotatable within a housing that contains a viscous damping fluid. Internal structures of the rotor and/or housing establish ports for relative movement of the damping fluid and rotor, thereby providing a desired degree of resistance or "damping".

Both one-way and two-way dampers are known. As the names imply, a one-way damper controls movement in only one direction while applying minimal resistance to movement in the opposite direction, and a two-way damper provides resistance or control of movement in both directions. To provide one-way damping, it is known to have driving structure between the damper and the component controlled that engages for movement in one direction and disengages for movement in the other direction. The engagement and disengagement can be problematic if not effected completely, and operation is compromised if not firmly engaged and/or noisy if not completely disengaged and separated.

It is known to use automatically retracting straps to control or direct crowd movement. For example, in public facilities, it is known to provide a plurality of self-standing posts or pedestals with reel assemblies at the tops thereof, each having a length of nylon or other webbing material wound therein. Each post further includes one or more slot for engaging an end of a strap from an adjacent post. The stands are moved and arranged easily, with the straps connected therebetween to designate paths for crowd movement, to block areas people are to be restricted from and to otherwise define pedestrian traffic patterns when necessary. The web or strap is extendable outwardly from the reel, often tightening a spring or other retraction device in the process so that when the web is released it automatically retracts, rewinding on the reel. To ensure efficient and complete wind up, and to hold the web securely in the wound up state, the automatic drive features are known to be both strong and rapid. However, the rapid roll-up of the web having a hardened plastic fixture at the distal end thereof for engaging an adjacent post can cause random whipping and uncontrolled movement as the extended web length rapid shortens. In large crowds it sometimes happens that a post is inadvertently tipped over causing attached straps to disengage within a crowded area. Individuals leaning on a post or strap, individuals manipulating or moving the components and other random acts can cause an unintended disengagement of strap ends from adjacent posts, and the rapid, random wind-up that sometimes occurs.

It is desirable to provide a crowd control device with a more effective damper, and a damper that engages and disengages effectively for use in the crowd control device and other structures.

SUMMARY OF THE INVENTION

The present invention provides a damper with a drive arrangement that engages and disengages effectively, which can be used within a reel assembly of a crowd control device so that a strap can be unwound from the reel without interference, but unguided rewind is controlled at even, consistent acceleration so that random whipping is minimized. Biasing force is applied in opposite directions from between the damper and the damper gear against the damper and damper gear.

In one aspect of one form of one embodiment, a movement dampened device is provided with a moving component of the device during operation, a nonmoving component of the device during operation and a device gear connected to one of the moving and nonmoving components. A damper assembly is connected to the other of the moving and nonmoving components. The damper assembly includes a damper having a rotor and a rotor shaft, a damper gear operatively disposed on the rotor shaft for operative engagement with the device gear and a biasing means between the damper and the damper gear exerting force against the damper and the damper gear in opposite directions.

In another aspect of another form of another embodiment, a damper assembly is provided with a damper including a housing, a rotor in the housing and a rotor shaft extending outwardly from the housing, and a damper gear disposed on a distal end of the rotor shaft. A damper bracket has a body between the damper and the damper gear and legs disposed outwardly of the damper and defining features therein for attaching the damper assembly in a device. Cooperating engaging structures on the damper housing and the damper bracket are provided for selectively engaging and disengaging the damper housing from the bracket for enabling and disabling relative rotation therebetween. The damper bracket defines biasing structure operating against the damper housing and against a side of the damper gear facing the damper housing.

In a further aspect of a further form of a further embodiment, a damper assembly is provided with a damper bracket having a body and legs and a damper disposed between the damper legs on one side of the damper bracket body. A rotor in the damper has a shaft extending outwardly therefrom through the damper bracket body. A damper gear is disposed on the rotor shaft on a second side of the damper bracket body. The damper bracket body is configured to provide biasing force from between the damper and the damper gear, the biasing force being exerted against each the damper and the damper gear.

An advantage of one aspect of an embodiment of the damper drive arrangement disclosed herein is that it provides effective engagement and disengagement of the damper drive mechanism.

Another advantage of another aspect of an embodiment of the damper drive arrangement disclosed herein is that it can be installed in retractable belt-type crowd control devices to minimize random whipping during rewind.

Other features and advantages will become apparent to those skilled in the art upon review of the following detailed description, claims and drawings in which like numerals are used to designate like features.

Figure 1:
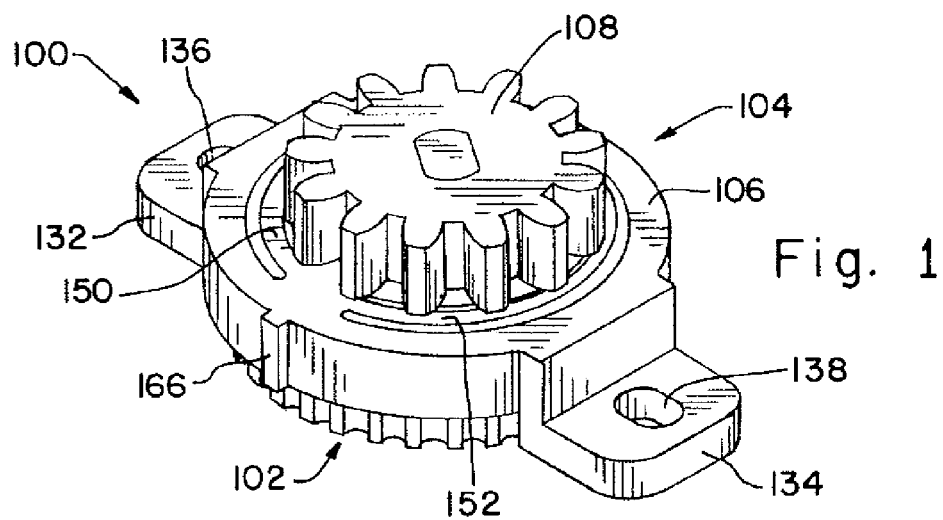
FIG. 1 is a perspective view of a damper assembly.
Figure 2:
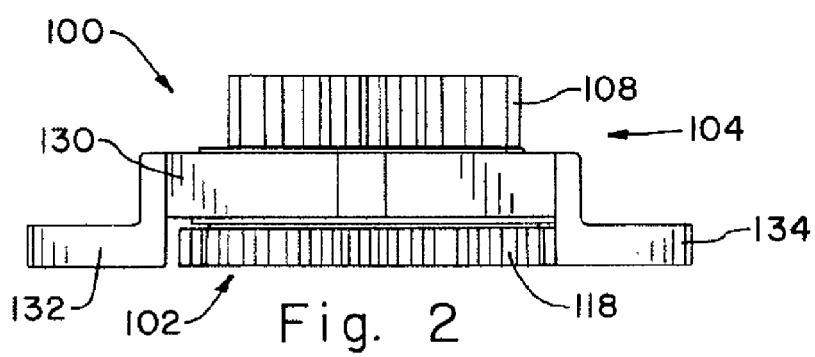
FIG. 2 is an elevational view of the damper assembly shown in FIG. 1.
Figure 3:
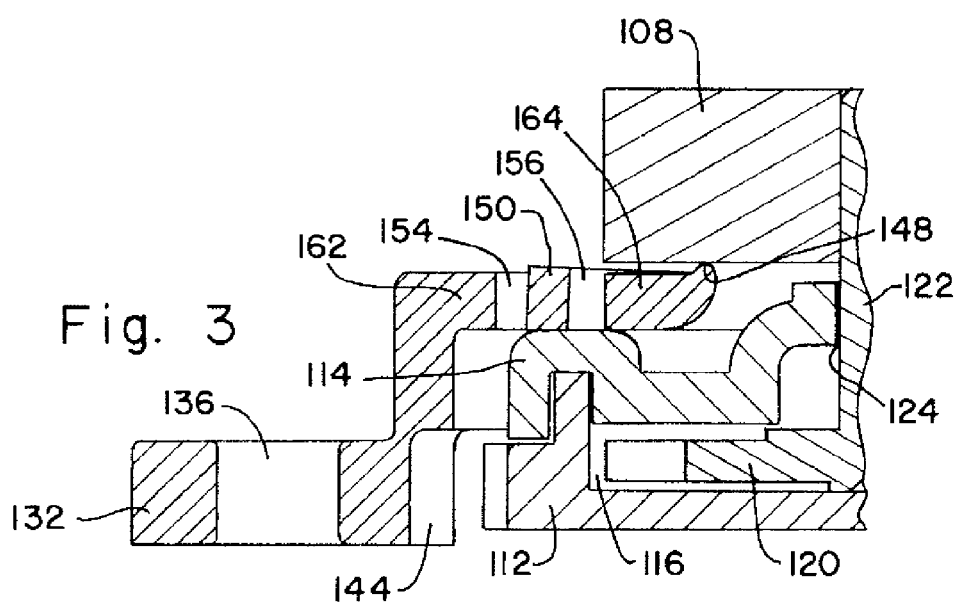
FIG. 3 is an enlarged, fragmentary, cross-sectional view of a portion of the damper assembly shown in FIGS. 1 and 2.
Figure 4:
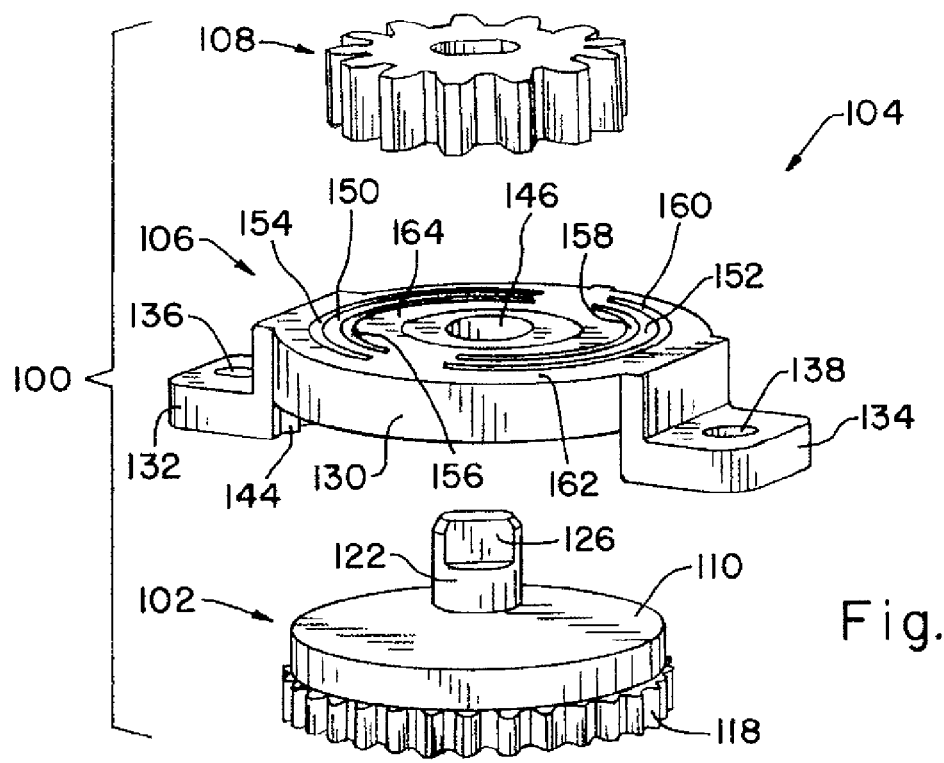
FIG. 4 is an exploded view of the damper assembly.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and particularly to FIGS. 1-6, an exemplary damper assembly 100 is shown. Damper assembly 100 includes a damper 102 and a drive assembly 104 including a bracket 106 and a damper gear 108.

Damper 102 is a viscous rotary gear damper having an outer housing 110, which may be multiple components fastened one to another by, for example, ultrasonic welding. In the exemplary embodiment shown, housing 110 includes a shell 112 and a cover 114 attached thereto. Shell 112 and cover 114 together define an interior volume 116 which is filled with a viscous damping fluid in the completed assembly. Shell 112 defines cogs or ribs 118 on the outer periphery thereof, which, in the exemplary embodiment, surround shell 110 at one end of damper 102. Cogs 118 are fixed elements with respect to shell 112, and can be integral formations in shell 112. Damper 102 further includes a rotor 120 which is rotatable within volume 116 and includes a shaft 122 which extends outwardly of cover 114 through a hole 124. A flattened distal end 126 of shaft 122 is configured for driving engagement with damper gear 108 so that rotation of shaft 122 causes damper gear 108 to rotate directly with shaft 122.

As known to those skilled in the art, viscous dampers include baffles and restrictions of various types for channeling the movement of damping fluid relative to rotation of a rotor within a contained space to control the rotation of the rotor and provide a damping function. Accordingly, rotation of the external gear connected to the rotor is controlled, and the controlled rotation can be transferred through a gear couple between the exposed gear connected to the rotor and a gear on the device the movement of which is to be controlled, such as a windup spool for a crowd control device.

Bracket 106 includes a main body 130 and mounting legs 132, 134 projecting from diametrically opposed sides of body 130. In the exemplary embodiment shown, each mounting leg 132, 134 defines a hole 136, 138, respectively, for receiving fasteners 140, 142 (FIG. 7) for attaching bracket 106 in an installation. In the exemplary embodiment shown, fasteners 140, 142 are threaded screw-type fasteners. It should be understood that other types of attachment are also possible, such as, for example and not limitation, fasteners of types other than screws; attachments without independent fasteners, such as snap-in features on the legs received in holes; and clamps, hold-downs or adhesives for securing the bracket within an installation.

One leg 134 defines cogs or teeth 144 on the inside thereof to engage cogs or ribs 118 on shell 110. Body 130 defines a central aperture 146 through which damper shaft 122 extends. Central aperture 146 is formed with and in body 130 so as to establish an upwardly extending ridge or rim 148 along the edge of material defining aperture 146. One or more flex bar 150, 152 is defined in body 130 outwardly and on opposite sides of central aperture 146. In the exemplary embodiment two such flex bars 150, 152 are shown, one flex bar 150, 152 on each of opposite sides of central aperture 146. Flex bars 150, 152 in the exemplary embodiment shown are arcuate bodies defined between pairs of curved slots 154, 156 and 158, 160 respectively.

Bracket 106 is configured, installed and adapted to provide biasing forces in opposite directions from between housing 110 and damper gear 108. Accordingly, legs 132, 134 are sized so that bracket 106 provides downward clamping force against housing 110 when damper assembly 100 is installed. Arcuate flex bars 150, 152 are positioned to bias against the upper surface of cover 114 as a radially outermost portion 162 (FIG. 3) of body 130 is drawn downwardly when legs 132, 134 are fastened in place. At the same time, a radially innermost portion 164 of body 130 is clamped between cover 114 and the underside of the damper gear 108. Bracket 106 also may include one or more protrusion 166 or other feature for locating bracket 106 within a device.

Damper gear 108 is connected by a snap-fit connection onto rotor shaft 122. The snap-fit connection is configured such that prior to snapping together, the gear is caused to push down against rim 148 while innermost portion 164 is pushed against cover 114 of damper housing 110. Then, when the gear is snapped to the post of the rotor, there is a built in biasing force between the top of the damper and the gear on the post. The bracket including flex bars 150, 152 and outer and inner portions 162, 164 ensures a tight or desirable connection between the gear and the damper on account of the force applied by the flex bars against the damper and the gear. This force is not enough to prevent the damper assembly from moving as desired during operation, to engage and disengage cogs 118 with cogs 144. However, the biasing force of bracket 106 helps ensure the mating of the cogs during damping and disengagement of the cogs during free running.

Damper assembly 100 uses the engagement and disengagement of cooperating engagement structures on housing 110 and bracket 106, that is cogs 118 and cogs 144, to alternatively provide damping effect (when the cogs are engaged) and free-wheeling with no damping effect (when the cogs are disengaged. When the cogs are disengaged, damper housing 110 can move relative to bracket 106. Accordingly, no relative rotation occurs between damper housing 110 and rotor 120. Conversely, when the cogs are engaged damper housing 110 is held stationary relative to bracket 106. Accordingly, relative rotation occurs between damper housing 110 and rotor 120 such that damping effect is transferred via damper gear 108.

Figure 6:
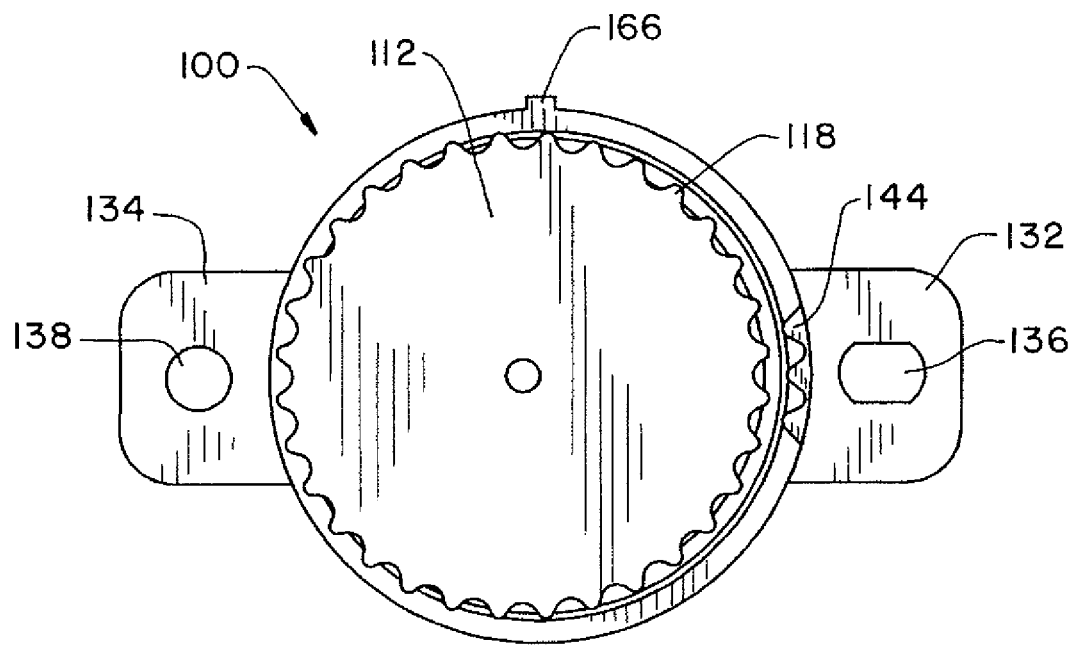
FIG. 6 is a plan view similar to FIG. 5, but with the damper assembly adjusted to an operating position for free, non-damped rotation.

Flex bars 150, 152 help hold damper 102 and bracket 106 in place, either in the damping condition when the cogs engage (FIG. 5) or in the free run condition when the cogs do not engage (FIG. 6). Without the resistance or desired force applied by bracket 106 against damper 102 and damper gear 108, the cogs may not engage or disengage as desired, particularly if the vertical orientation of the damper is altered, such as when a crowd control device on a post is tipped over. When the free running, non-damping condition is desired, the flex bars cooperate with the damper and gear to ensure non-engagement between the cogs. Without the resistance or desired force, the cogs may undesirably engage partially, causing an unwanted ratcheting noise from operation of the damper within a device. The bracket provides a force to ensure the proper location and operation of the damper relative to the bracket and a device engaged with the damper.

Figure 7:
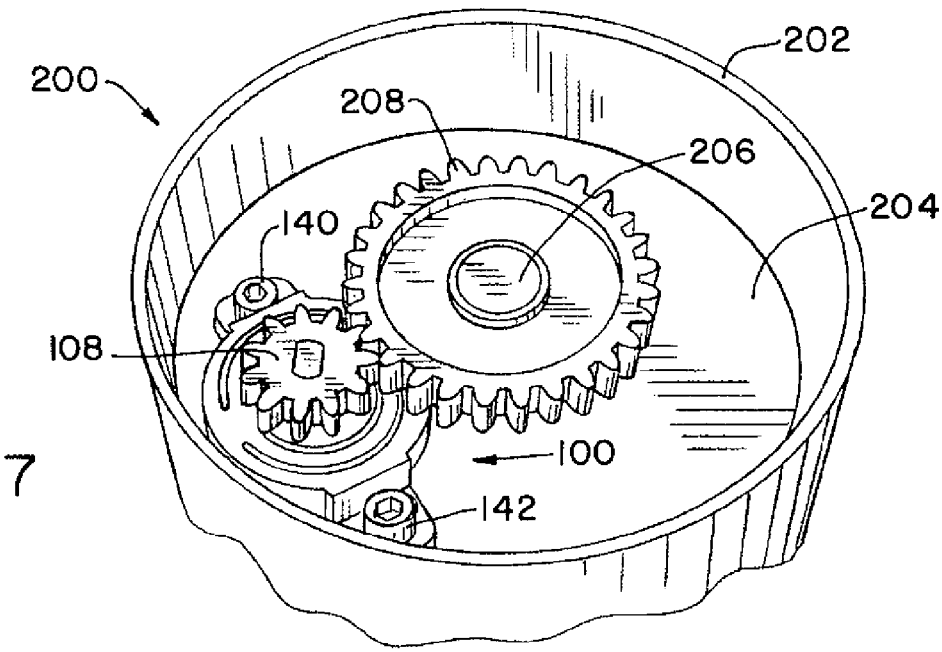
FIG. 7 is a perspective view of the damper assembly in a movement dampened device.
Figure 5:
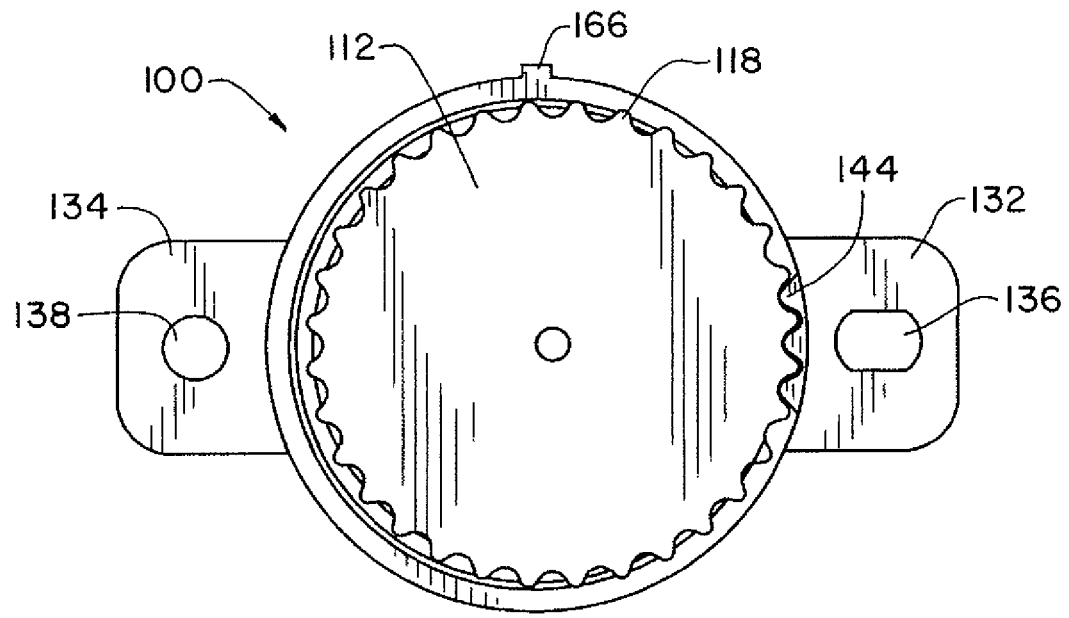
FIG. 5 is a plan view of the damper assembly adjusted to an operating position for damping.

FIG. 7 illustrates a movement dampened device 200 including damper assembly 100. For example and not limitation, dampened device 200 can be a crowd control real mechanism for a rope, strap, web or the like. Movement dampened device 200 includes an outer body 202 and a stationary end plate 204. A moving component of device 200 includes a rotatable shaft 206 extending through end plate 204. A gear 208 is drivingly disposed on shaft 206 and is operatively engaged with damper gear 108. Accordingly, the damping effect of damper assembly 100 is conveyed to the movement of the moving component in device 200 via the geared connection between damper gear 108 and device gear 208.

Figure 8:
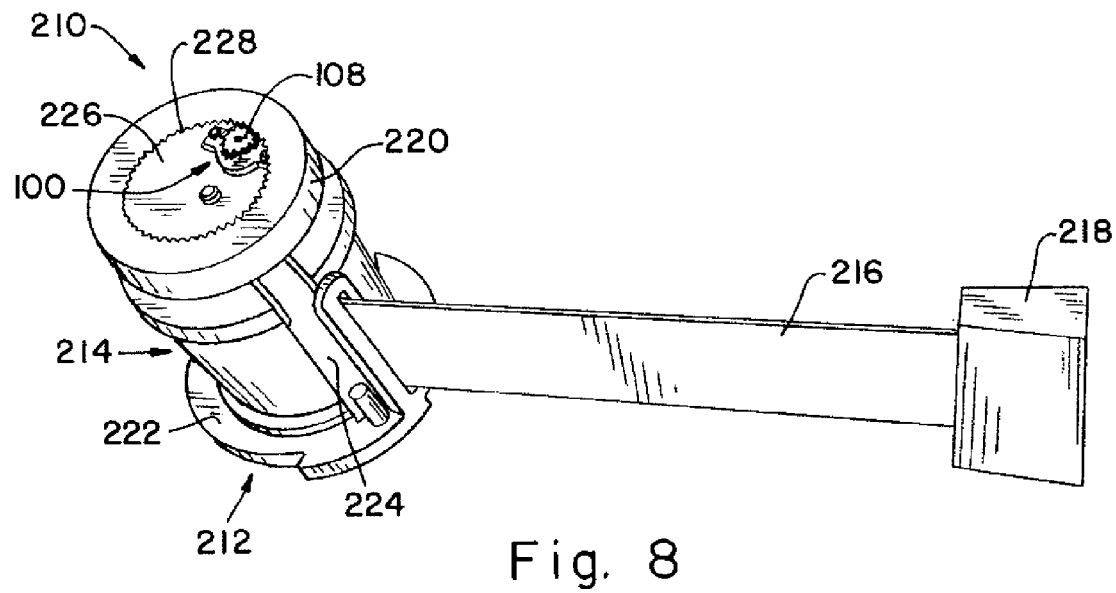
FIG. 8 is a perspective view of a crowd control assembly with the damper assembly and a web of the device extended.
Figure 9:
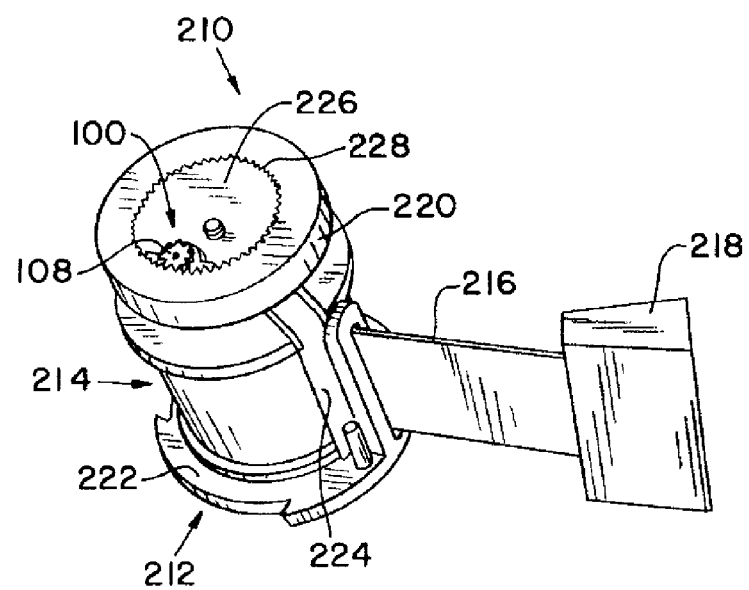
FIG. 9 is a perspective view of the crowd control assembly with the web thereof partly retracted.

FIGS. 8 and 9 illustrate another movement dampened device which is a crowd control device 210 suitable for attachment on or within a self-standing post, or in a housing mounted on a wall or other structure. Crowd control device 210 includes a reel assembly 212 having a spool 214 and a web, rope, belt or strap 216 wound on the spool. A fixture 218 at the distal end of strap 216 can be secured to another structure or post of a similarly structured crowd control device, or to a simple receiving bracket made therefor, as those skilled in the art will readily understand. Reel assembly 212 includes a head 220, a base 222 and pillars 224 disposed between the head and the base. A cap plate 226 is connected to spool 214 to rotate therewith. A damper assembly 100, as described previously herein, is mounted on cap plate 226 to move with plate 226 and spool 214. An internally toothed ring gear 228 is fixed to head 220, and does not move. Damper gear 108 engages ring gear 228 so that, as a spool 214, plate 226 and damper assembly 100 move, damper gear 108 revolves within ring gear 228 in driving engagement with the teeth of ring gear 228. Accordingly, the damping function of damper assembly 100 is transferred to the turning of spool 214 through the driving relationship of damper gear 108 and ring gear 228 and the connection of the damper assembly to the spool. Damper assembly 100 improves and promotes smooth consistent speed and acceleration so that wind up occurs with less random whipping, even if wind up is interfered with by catching or restraining of the strap as it winds. The damper moderates inconsistencies in speed and acceleration. If a one-way damper assembly is provided, damping control can be limited to the windup function, with unwinding being uninfluenced by the damper.

It should be understood further that still other types of damper engaging arrangements can be used also for connecting the damper assembly to a movement dampened device. Other gearing arrangements can be used whereby one of a cooperating gear from the device or the damper gear is fixed with respect to the nonmoving part of the device, such as a head or other portions of a crowd control device, and the other of the cooperating gear and the damper gear is affixed to, for rotation with the moving part of the device, such as a spool and/or other rotating parts of the reel assembly in a crowd control device. Accordingly, the controlling features of the damper are transferred to the moving parts of the device, such as the rollup feature of the spool in a crowd control device.

While specific applications and uses of a damper assembly in crowd control devices have been shown and described, those skilled in the art will readily understand that a damper assembly can be used in a wide variety of other structures and devices having moving parts, including those found in furniture, various automotive applications and devices of many other types.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A movement dampened device, comprising:
a moving component of the device during operation;
a nonmoving component of the device during operation;
a device gear connected to one of said moving component and said nonmoving component;
a damper assembly connected to the other of said moving component and said nonmoving component, said damper assembly including:
a damper having a rotor and a rotor shaft; and
a damper gear operatively disposed on said rotor shaft for operative engagement with said device gear; and
a fixed bracket secured around said damper, wherein said bracket includes portions exerting force against said damper and said damper gear in opposite directions generally parallel with an axis extending through said rotor shaft.

2. The movement dampened device of claim 1, said damper having a movable housing with cogs thereon, and said damper assembly further including fixed cogs selectively engageable with and disengageable from said cogs on said damper housing.

3. The movement dampened device of claim 2, said bracket having said fixed cogs thereon.

4. The movement dampened device of claim 3, said bracket having a body between said damper and said damper gear, and legs on opposite sides of said damper.

5. The movement dampened device of claim 4, said moving component being a spool of a crowd control device.

6. The movement dampened device of claim 1, said moving component being a spool of a crowd control device.

7. The movement dampened device of claim 1, said damper assembly being connected to and movable with said moving component, and said device gear being connected to said nonmoving component.

8. The movement dampened device of claim 1, said damper assembly being connected to said nonmoving component, and said device gear being connected to and movable with said moving component.

9. A damper assembly comprising:
   a damper including a housing, a rotor in said housing and a rotor shaft extending outwardly from said housing;
   a damper gear disposed on a distal end of said rotor shaft;
   a damper bracket having a body between said damper and said damper gear and legs disposed outwardly of said damper and defining features therein for attaching said damper assembly in a device;
   cooperating engaging structures on said damper housing and said damper bracket for selectively engaging and disengaging said damper housing from said bracket for enabling and disabling relative rotation therebetween; and
   said damper bracket defining biasing structure operating against said damper housing and against a side of said damper gear facing said damper housing.

10. The damper assembly of claim 9, said damper bracket body having slots therein defining flexible bars therebetween, said flexible bars disposed against said damper housing; and an inner portion of said damper bracket body having a rim projecting toward and against said damper gear.

11. The damper assembly of claim 10, said damper bracket body defining a central aperture therethrough, and said rotor shaft projecting through said central aperture.

12. The damper assembly of claim 9, said damper housing and one of said damper legs having cogs thereon for selective engagement and disengagement with one another.

13. The damper assembly of claim 9, said damper bracket body having an outer most portion biased against said damper housing and an inner most portion biased against said damper gear.

14. A damper assembly comprising:
   a damper bracket having a body and legs;
   a damper disposed between said damper legs on one side of said damper bracket body;
   a rotor in said damper having a shaft extending outwardly therefrom through said damper bracket body;
   a damper gear disposed on said rotor shaft on a second side of said damper bracket body; and
   said damper bracket body providing biasing force from between said damper and said damper gear, said biasing force being exerted against each said damper and said damper gear in a direction generally parallel to an axis extending through said rotor shaft.

15. The damper assembly of claim 14, said damper having a damper housing with external cogs thereon; and said bracket having second cogs thereon selectively engageable with and disengageable from said cogs of said damper housing.

16. The damper assembly of claim 15, said second cogs being disposed on one of said legs.

17. The damper assembly of claim 14, said damper bracket body having an outermost portion biased against said damper housing and an innermost portion biased against said damper gear.

18. The damper assembly of claim 17, said innermost portion having a rim projecting toward said damper gear.

19. The damper assembly of claim 16, said bracket being affixed within a crowd control device and said damper gear being operatively engaged with a gear of said crowd control device.

* * * * *